(12) United States Patent
Miyata et al.

(10) Patent No.: US 10,119,557 B2
(45) Date of Patent: Nov. 6, 2018

(54) HYDRAULIC DRIVING DEVICE

(71) Applicant: Komatsu Ltd., Tokyo (JP)

(72) Inventors: Takuya Miyata, Oyama (JP); Shinobu Naitou, Oyama (JP)

(73) Assignee: Komatsu Ltd., Tokyo (JP)

( * ) Notice: Subject to any disclaimer, the term of this patent is extended or adjusted under 35 U.S.C. 154(b) by 225 days.

(21) Appl. No.: 14/385,628

(22) PCT Filed: May 29, 2014

(86) PCT No.: PCT/JP2014/064339
§ 371 (c)(1),
(2) Date: Sep. 16, 2014

(87) PCT Pub. No.: WO2015/181934
PCT Pub. Date: Dec. 3, 2015

(65) Prior Publication Data
US 2016/0238043 A1    Aug. 18, 2016

(51) Int. Cl.
*F15B 13/042* (2006.01)
*F15B 11/08* (2006.01)
(Continued)

(52) U.S. Cl.
CPC .............. *F15B 13/042* (2013.01); *F03C 1/26* (2013.01); *F15B 11/08* (2013.01);
(Continued)

(58) Field of Classification Search
CPC .. F15B 2211/40515; F15B 2211/40507; F15B 13/042; F15B 21/045; F15B 13/06;
(Continued)

(56) References Cited

U.S. PATENT DOCUMENTS 2,982,260 A * 5/1961 Hunter ...................... F22D 5/18
137/112
3,589,401 A * 6/1971 Harding .................. F15B 13/04
137/625.67
(Continued)

FOREIGN PATENT DOCUMENTS

CN    1166678 A    12/1997
CN    1256382 A    6/2000
(Continued)

OTHER PUBLICATIONS

International Search Report and Written Opinion dated Sep. 2, 2014, issued for PCT/JP2014/064339.
(Continued)

*Primary Examiner* — Nathaniel E Wiehe
*Assistant Examiner* — Richard C Drake
(74) *Attorney, Agent, or Firm* — Locke Lord LLP

(57) ABSTRACT

A hydraulic driving device includes: a hydraulic motor configured to operate by flushing oil from a hydraulic pump through a high pressure oil passage and a low pressure oil passage; a low pressure selective valve configured to operate in accordance with differential pressure between the high pressure oil passage and the low pressure oil passage, and to discharge the oil in the low pressure oil passage inside a motor case; a tank oil passage configured to connect the inside of the motor case with an oil tank; and a choke throttle provided to the low pressure selective valve or to an oil passage lower than the low pressure selective valve.

4 Claims, 10 Drawing Sheets

(51) Int. Cl.

| | | |
|---|---|---|
| *F15B 13/04* | (2006.01) | |
| *F03C 1/26* | (2006.01) | |
| *F16H 61/4104* | (2010.01) | |
| *F16H 61/44* | (2006.01) | |
| *B60K 8/00* | (2006.01) | |
| *B66F 9/075* | (2006.01) | |
| *E02F 9/22* | (2006.01) | |
| *F15B 13/00* | (2006.01) | |

(52) U.S. Cl.
CPC ..... *F15B 13/0401* (2013.01); *F16H 61/4104* (2013.01); *F16H 61/44* (2013.01); *B60K 8/00* (2013.01); *B66F 9/07572* (2013.01); *E02F 9/2225* (2013.01); *E02F 9/2289* (2013.01); *F15B 2013/008* (2013.01)

(58) Field of Classification Search
CPC .............. F16H 61/4104; F16H 61/4139; E02F 9/2278; F16D 31/02; B67D 7/74
USPC ................................ 60/394, 464; 137/112, 1
See application file for complete search history.

(56) References Cited

U.S. PATENT DOCUMENTS

| | | | | |
|---|---|---|---|---|
| 3,997,282 | A * | 12/1976 | Thomas | F04B 49/20 417/34 |
| 4,024,797 | A * | 5/1977 | Johnson | B62D 11/183 91/514 |
| 4,520,625 | A * | 6/1985 | Sato | F15B 13/02 60/464 |
| 4,889,152 | A * | 12/1989 | Wilson | F17C 13/045 137/102 |
| 4,923,170 | A * | 5/1990 | Takaoka | B62D 5/087 180/441 |
| 6,295,811 | B1 | 10/2001 | Mangano et al. | |
| 6,360,717 | B1 * | 3/2002 | Chang | F02M 57/025 123/381 |
| 6,581,378 | B1 * | 6/2003 | Lebrun | E02F 9/123 60/394 |
| 6,705,290 | B2 * | 3/2004 | Puckett | F02D 41/32 123/381 |
| 6,817,177 | B2 * | 11/2004 | Bigo | F16K 17/18 60/464 |
| 7,637,102 | B2 * | 12/2009 | Gest | F15B 11/0445 60/394 |
| 8,132,588 | B1 * | 3/2012 | Langenfeld | F16K 11/048 137/100 |
| 8,272,358 | B2 * | 9/2012 | Yoshioka | F01L 1/3442 123/90.15 |
| 9,027,589 | B2 * | 5/2015 | Coolidge | F15B 13/026 137/488 |
| 9,267,590 | B2 | 2/2016 | Essig | |
| 2008/0041467 | A1 * | 2/2008 | Stretch | F01L 9/02 137/596.17 |
| 2011/0079293 | A1 * | 4/2011 | Gollner | F04B 23/04 137/312 |
| 2012/0067444 | A1 | 3/2012 | Amikura | |
| 2013/0305702 | A1 | 11/2013 | Essig | |
| 2014/0033692 | A1 * | 2/2014 | Nelson | B60K 6/12 60/327 |
| 2015/0300381 | A1 * | 10/2015 | Pozzo | E02F 9/2267 137/1 |

FOREIGN PATENT DOCUMENTS

| | | |
|---|---|---|
| CN | 102449345 A | 5/2012 |
| CN | 103442923 A | 12/2013 |
| EP | 1610040 A1 | 12/2005 |
| EP | 1610040 B1 | 12/2005 |
| JP | 62-170402 U | 10/1987 |
| JP | 11-030304 A | 2/1999 |
| JP | 2001-065527 A | 3/2001 |
| JP | 2002-521625 A | 7/2002 |
| JP | 2002-227998 A | 8/2002 |
| JP | 2004-347083 A | 12/2004 |
| JP | 2005-121158 A | 5/2005 |
| JP | 2008-101636 A | 5/2008 |
| JP | 2010-242953 A | 10/2010 |
| WO | 2004/083689 A1 | 9/2004 |
| WO | 2012/072185 A1 | 6/2012 |

OTHER PUBLICATIONS

Office Action dated Mar. 21, 2016, issued for the German Patent Application No. 11 2014 000 101.5 and English translation thereof.

\* cited by examiner

30···31,32,33,34

HYDRAULIC DRIVING DEVICE

FIELD

The present invention relates to a hydraulic driving device. More specifically, the present invention relates to a hydraulic driving device preferable for driving a hydraulic motor for running, which is mounted on a working vehicle used as a construction machine.

BACKGROUND

An example of a working vehicle, used as a construction machine such as a wheel loader and a forklift, includes one that makes a hydraulic motor operate by oil supplied from a hydraulic pump, and that is configured to run by rotating running wheels provided to an output shaft of the hydraulic motor. In a hydraulic driving device applied to such a working vehicle, oil in a low pressure oil passage is discharged to a motor case of the hydraulic motor through a low pressure selective valve. Further, the oil is discharged (flushed) to an oil tank from the motor case through a tank oil passage. On the other hand, the oil in the oil tank is supplied to the low pressure oil passage by a charge pump. Further, by delivering the oil outside the device, the hydraulic motor is cooled down (see, for example, Patent Literatures 1, 2, and 3).

CITATION LIST

Patent Literature

Patent Literature 1: Japanese Laid-open Patent Publication No. 2002-227998
Patent Literature 2: Japanese Laid-open Patent Publication No. 11-30304
Patent Literature 3: Japanese Laid-open Patent Publication No. 2008-101636

SUMMARY

Technical Problem

By the way, in the above-mentioned hydraulic driving device, in a case of carrying out shuttle operation, a sudden brake, or stop operation with respect to a working vehicle, high pressure is generated in a low pressured circuit to put on the break. Further, high pressured oil not only leaks from a rotating body of a hydraulic motor, but also flushes to a flushing circuit instantaneously. That causes a large amount of oil to be discharged inside a motor case. Therefore, it has been confirmed that excessive peak pressure is generated inside the motor case. In cases where the excessive peak pressure is repeatedly generated in the motor case, an oil seal between the motor case and an output shaft is damaged, which may cause oil leakage. The peak pressure in the motor case is comparatively low under a condition where oil temperature is high, as illustrated in the broken line in FIG. 7. However, it is likely that the lower the oil temperature becomes, the more the peak pressure increases. Accordingly, in such a type of the hydraulic driving device, it is necessary to suppress the peak pressure in the motor case under a condition where the oil temperature is low.

Herein, to suppress generation of the peak pressure inside the motor case, it can be considered to decrease an amount of oil to be flushed. However, in a case of decreasing the amount of the oil to be flushed, there is a possibility that cooling effect on the hydraulic motor may be deteriorated. Further, even in a method of reducing pressure damage of a tank oil passage, there is a limitation of package volume of the working vehicle. Therefore, there is a limitation to enlarge a diameter of a pipe size.

Considering the above-mentioned situation, an object of the present invention is to provide a hydraulic driving device capable of suppressing the generation of the peak pressure inside the motor case without deteriorating the cooling effect when the oil temperature inside the hydraulic motor is high.

Solution to Problem

To achieve the above-described object, a hydraulic driving device according to the present invention includes: a hydraulic motor configured to operate by flushing oil from a hydraulic pump through a high pressure oil passage and a low pressure oil passage; a low pressure selective valve configured to operate in accordance with differential pressure between the high pressure oil passage and the low pressure oil passage, and to discharge the oil in the low pressure oil passage inside a motor case; and a tank oil passage configured to connect the inside of the motor case with an oil tank, wherein a choke throttle is provided to the low pressure selective valve or to an oil passage lower than the low pressure selective valve.

Moreover, in the above-described hydraulic driving device according to the present invention, the high pressure oil passage supplies oil discharged from the hydraulic pump to the hydraulic motor, and the low pressure oil passage is connected so as to flow back the oil discharged from the hydraulic motor to the hydraulic pump, and is included in a closed circuit which circulatively supplies the oil between the hydraulic motor and the hydraulic pump together with the high pressure oil passage.

Moreover, in the above-described hydraulic driving device according to the present invention, the choke throttle is an annular gap flow that satisfies the following formula.

$$0 < (\delta^2) \cdot d/L < 2.5$$

where $\delta = (D-d)/2$, "D" represents a choke external diameter, "d" represents a choke internal diameter, and "L" represents a choke length.

Moreover, in the above-described hydraulic driving device according to the present invention, the choke throttle is a cylindrical gap flow that satisfies the following formula.

$$0 < (d^4)/L < 1.6$$

where "d" represents a choke internal diameter, while "L" represents a choke length.

Advantageous Effect of Invention

According to the present invention, a choke throttle easily influenced by oil viscosity is involved in a low pressure selective valve or in an oil passage provided lower than the low pressure selective valve. Herein, a filtering flow volume of oil decreases under a condition where oil temperature is low. On the other hand, the filtering flow volume increases while the oil temperature increases. Therefore, under the condition where the oil temperature is low, an amount of oil to be discharged from a low pressure oil passage to a motor case is decreased by the choke throttle. As a result, it is possible to reduce peak pressure generated inside the motor case. Further, under a condition where the oil temperature is high, the filtering flow volume of the oil increases. Therefore, the amount of the oil to be flushed can be sufficiently acquired, and there is no possibility that the cooling effect on a hydraulic motor is deteriorated.

BRIEF DESCRIPTION OF DRAWINGS

FIG. 3-1 is a cross-sectional view illustrating main parts of the hydraulic motor unit illustrated in FIG. 2, and illustrating a state that a spool of a low pressure selective valve comes into a neutral position.

FIG. 3-2 is a cross-sectional view in a case of operating the spool of the low pressure selective valve of the hydraulic motor unit illustrated in FIG. 3-1.

FIG. 5-1 is a cross-sectional view illustrating main parts of a hydraulic motor unit applied to a hydraulic driving device according to a second embodiment of the present invention, and illustrating a state that a spool of a low pressure selective valve comes into a neutral position.

FIG. 5-2 is a cross-sectional view in a case of operating the spool of the low pressure selective valve of the hydraulic motor unit illustrated in FIG. 5-1.

FIG. 6-1 is a cross-sectional view illustrating main parts of a hydraulic motor unit applied to a hydraulic driving device according to a third embodiment of the present invention, and illustrating a state that a spool of a low pressure selective valve comes into a neutral position.

FIG. 6-2 is a cross-sectional view in a case of operating the spool of the low pressure selective valve of the hydraulic motor unit illustrated in FIG. 6-1.

DESCRIPTION OF EMBODIMENT

Hereinafter, a preferable embodiment of a hydraulic driving device according to the present invention will be described in detail with reference to the accompanying drawings.

(First Embodiment)

Figure 1:
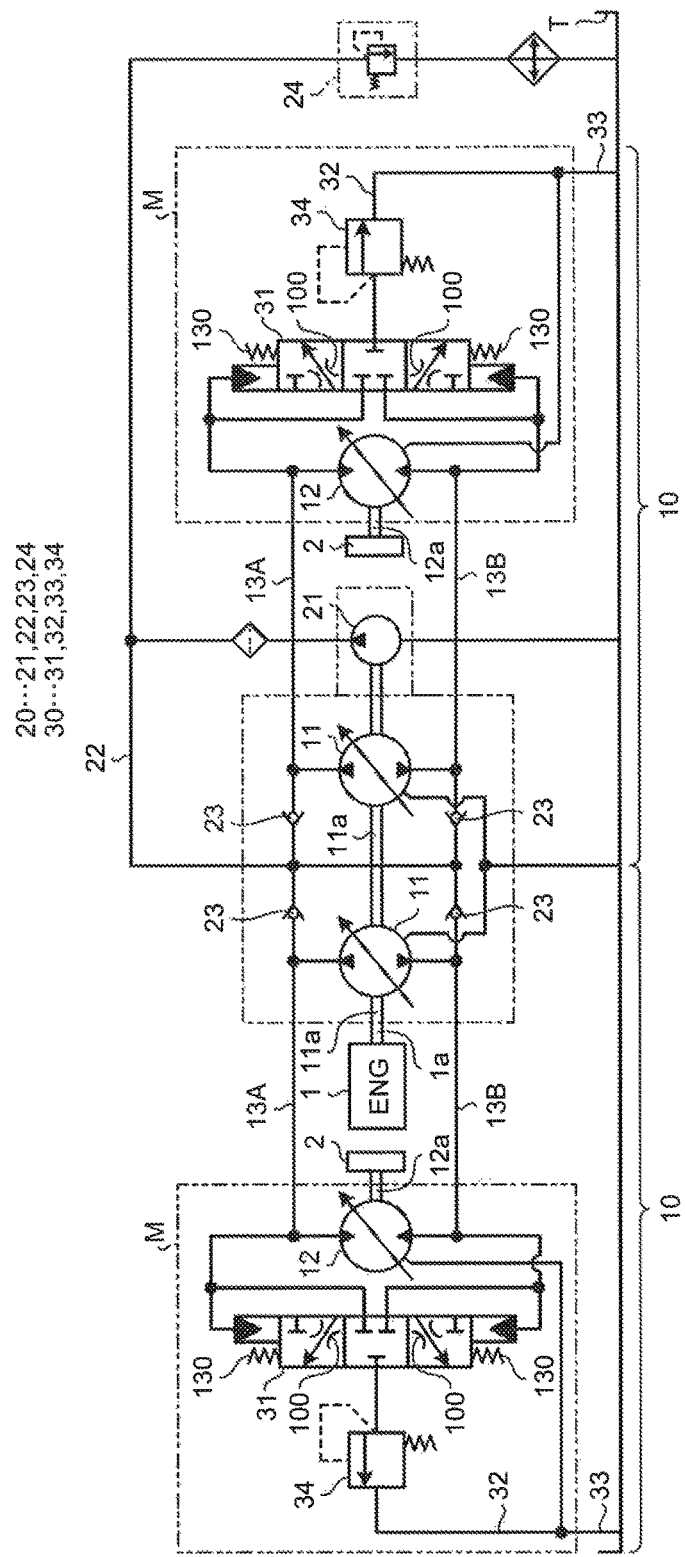
FIG. 1 is a view of a hydraulic circuit illustrating a hydraulic driving device according to a first embodiment of the present invention.

FIG. 1 is a view of a hydraulic circuit illustrating a hydraulic driving device according to a first embodiment of the present invention. The hydraulic driving device exemplified herein is used for running a working vehicle used as a construction machine such as a wheel loader and a forklift. Further, the hydraulic driving device includes an engine 1 and hydraulic transmission units 10 separately provided between driving wheels 2 on the right and left. The hydraulic transmission units 10 provided to each of the driving wheels 2 have a similar configuration. Therefore, one of the units will be hereinafter described. The other will be denoted by the same reference numerals, and will not be described herein.

The hydraulic transmission unit 10 is a so-called hydrostatic transmission (HST), and includes a hydraulic pump 11, a hydraulic motor 12, and a pair of main oil passages 13A and 13B. The hydraulic pump 11 is driven by the engine 1. The hydraulic motor 12 is for running and is driven by oil supplied from the hydraulic pump 11. The pair of main oil passages 13A and 13B are included in a closed circuit for circulatively supplying oil between the hydraulic pump 11 and the hydraulic motor 12.

The hydraulic pump 11 and the hydraulic motor 12 are of variable displacement type, in which each displacement volume changes by changing a tilt angle of each swash plate or each swash shaft. Regarding the hydraulic pump 11, an input shaft 11a is connected to an output shaft 1a of the engine 1. Regarding the hydraulic motor 12, an output shaft 12a thereof is connected to the driving wheel 2 of the working vehicle. Therefore, the hydraulic motor 12 can make the working vehicle run by rotatably driving the driving wheel 2. A rotating direction of the hydraulic motor 12 can be changed depending on a direction of the oil supplied from the hydraulic pump 11, to make the working vehicle move forward or backward. Hereinafter, in a case of discriminating the pair of main oil passages 13A and 13B, for convenience sake, one that is connected to a discharging port located on the upper side of the hydraulic pump 11 in FIG. 1 will be referred to as a "first main oil passage 13A". On the other hand, the other that is connected to a discharging port located on the lower side of the hydraulic pump 11 in FIG. 1 is referred to as a "second main oil passage 13B".

A charge unit 20 is fixed on the hydraulic transmission unit 10. The charge unit 20 is configured to include a charge pump 21, a charge oil passage 22, and a charge safety valve 24. The charge pump 21 is driven by the engine 1. Regarding the charge oil passage 22, one end thereof is connected to a discharging port of the charge pump 21, while the other end is branched so as to be connected to the first main oil passage 13A and the second main oil passage 13B through check valves 23. The charge safety valve 24 is involved in the charge oil passage 22.

In the charge unit 20, the charge pump 21 is driven at all times when the engine 1 drives. In this state, for example, in cases where pressure of the first main oil passage 13A or that of the second main oil passage 13B becomes lower than a preset pressure of the charge safety valve 24 because of external leakage of the hydraulic pump 11 or the hydraulic motor 12, oil is filled from the charge pump 21 with respect to an appropriate one of the main oil passages 13A and 13B or both of them. In cases where both pressure of the first main oil passage 13A and of the second main oil passage 13B is higher than the preset pressure of the charge safety valve 24, the oil discharged from the charge pump 21 is returned to an oil tank T through the charge safety valve 24.

Figure 2:
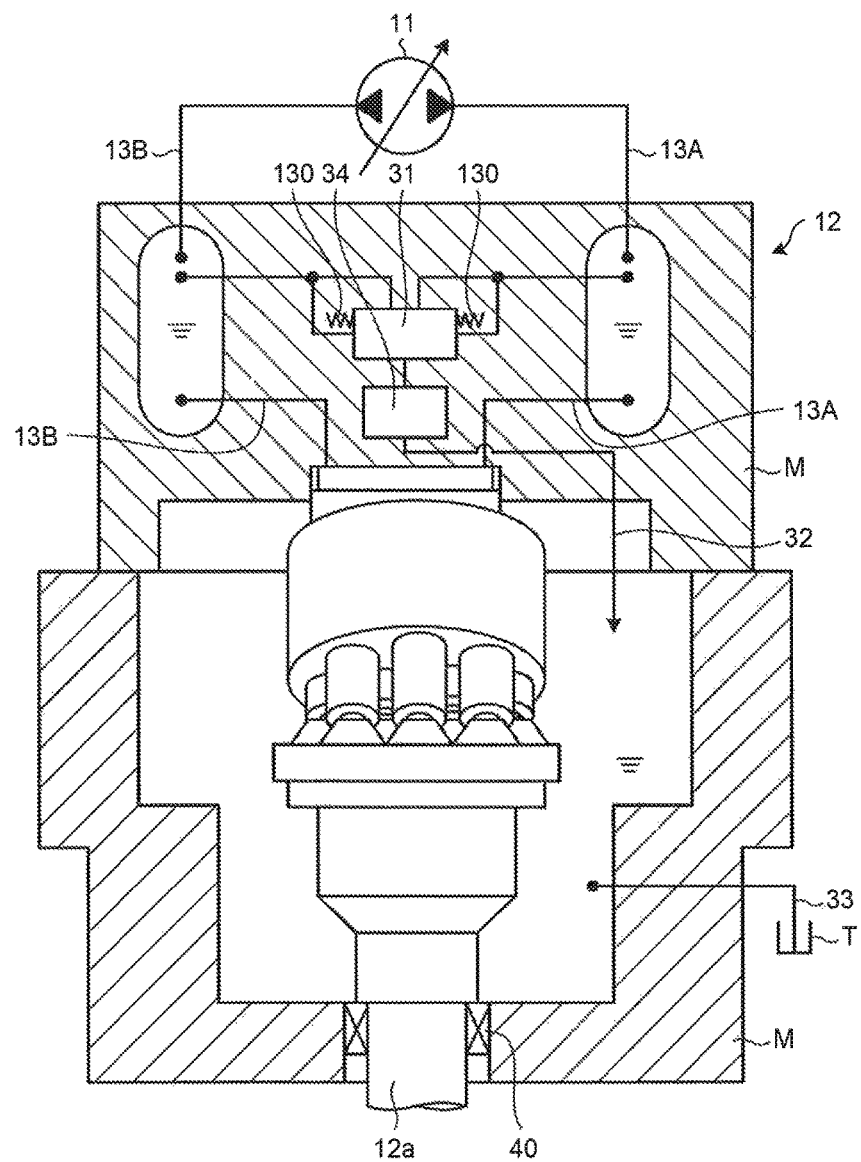
FIG. 2 is a cross-sectional view schematically illustrating a configuration of a hydraulic motor unit applied to the hydraulic driving device illustrated in FIG. 1.

Further, in the hydraulic transmission unit 10, a flushing unit 30 is provided to a motor case M of the hydraulic motor 12, as illustrated in FIGS. 1 and 2. The flushing unit 30 is configured to include a low pressure selective valve 31, a case drain oil passage 32, a tank oil passage 33, and a charge relief valve 34. The low pressure selective valve 31 operates in accordance with differential pressure of the pair of main oil passages 13A and 13B, and selects either the main oil passage 13A or 13B in the lower pressure side. The case drain oil passage 32 communicates, with the inside of the motor case M, either the main oil passage 13A or 13B in the lower pressure side selected by the low pressure selective valve 31. The tank oil passage 33 connects the inside of the motor case M with the oil tank T. The charge relief valve 34 is involved in the case drain oil passage 32.

In the flushing unit 30, in cases where pressure of the main oil passage 13A or 13B in the lower pressure side selected by the low pressure selective valve 31 becomes higher than a preset pressure of the charge relief valve 34 (<the preset pressure of the charge safety valve 24), the oil in the main oil passage 13A or 13B in the lower pressure side is discharged inside the motor case M. Further, the oil in the motor case M is discharged to the oil tank T through the tank oil passage 33.

In the hydraulic transmission unit 10 configured in the above-mentioned way, when the hydraulic pump 11 is driven by the engine 1, the oil is circulatively supplied to the hydraulic motor 12 through the pair of main oil passages 13A and 13B. Herein, the driving wheels 2 rotatably drive by driving the hydraulic motor 12, which makes the working vehicle run. In this period, by operating the charge unit 20 and the flushing unit 30, the oil which passes the main oil passages 13A and 13B is delivered outside the device, and is cooled down. As a result, the hydraulic motor 12 is cooled down.

Figure 7:
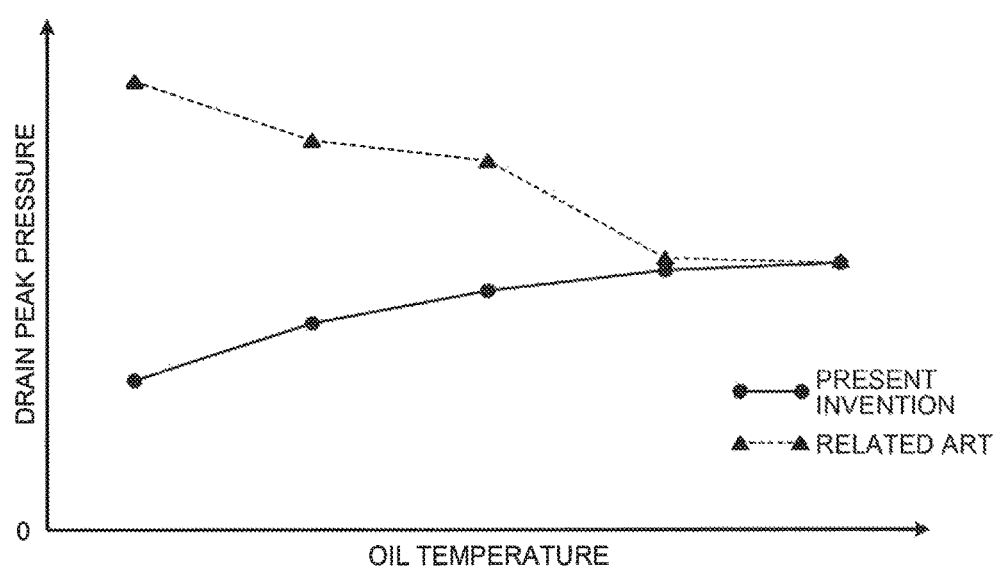
FIG. 7 is a graph illustrating a relation between oil temperature and peak pressure inside a motor case.

Herein, in a case of carrying out shuttle operation, a sudden brake, or stop operation with respect to the working vehicle, an amount of the oil discharged to the motor case M increases by operating the flushing unit 30. Therefore, peak pressure is generated inside the motor case M as illustrated by the broken line in FIG. 7, and there is a possibility that an oil seal 40 between the motor case M and the output shaft 12a is damaged.

To suppress generation of the peak pressure inside the motor case M, it can be considered to decrease an amount of oil to be flushed. However, in a case of decreasing the amount of the oil to be flushed, there is a possibility that cooling effect on the hydraulic motor 12 may be deteriorated.

Accordingly, in the hydraulic driving device, a choke throttle 100 is provided to the low pressure selective valve 31, as illustrated in FIG. 1, to solve the above-mentioned problem. In other words, in a case of providing the choke throttle 100 which is easily influenced by oil viscosity, a filtering flow volume of the oil decreases while the oil temperature decreases. As a result, under a condition where the oil temperature is low, the amount of the oil, which is to be discharged to the motor case M from the main oil passage 13A or 13B in the lower pressure side, decreases by the choke throttle 100. Therefore, it is possible to suppress generation of the peak pressure inside the motor case M, as illustrated by the solid line in FIG. 7. Further, under a condition where the oil temperature is high, the filtering flow volume of the oil increases. Therefore, the amount of the oil to be flushed can be sufficiently acquired, and there is no possibility that the cooling effect on the hydraulic motor 12 is deteriorated.

Figures 1, 3:
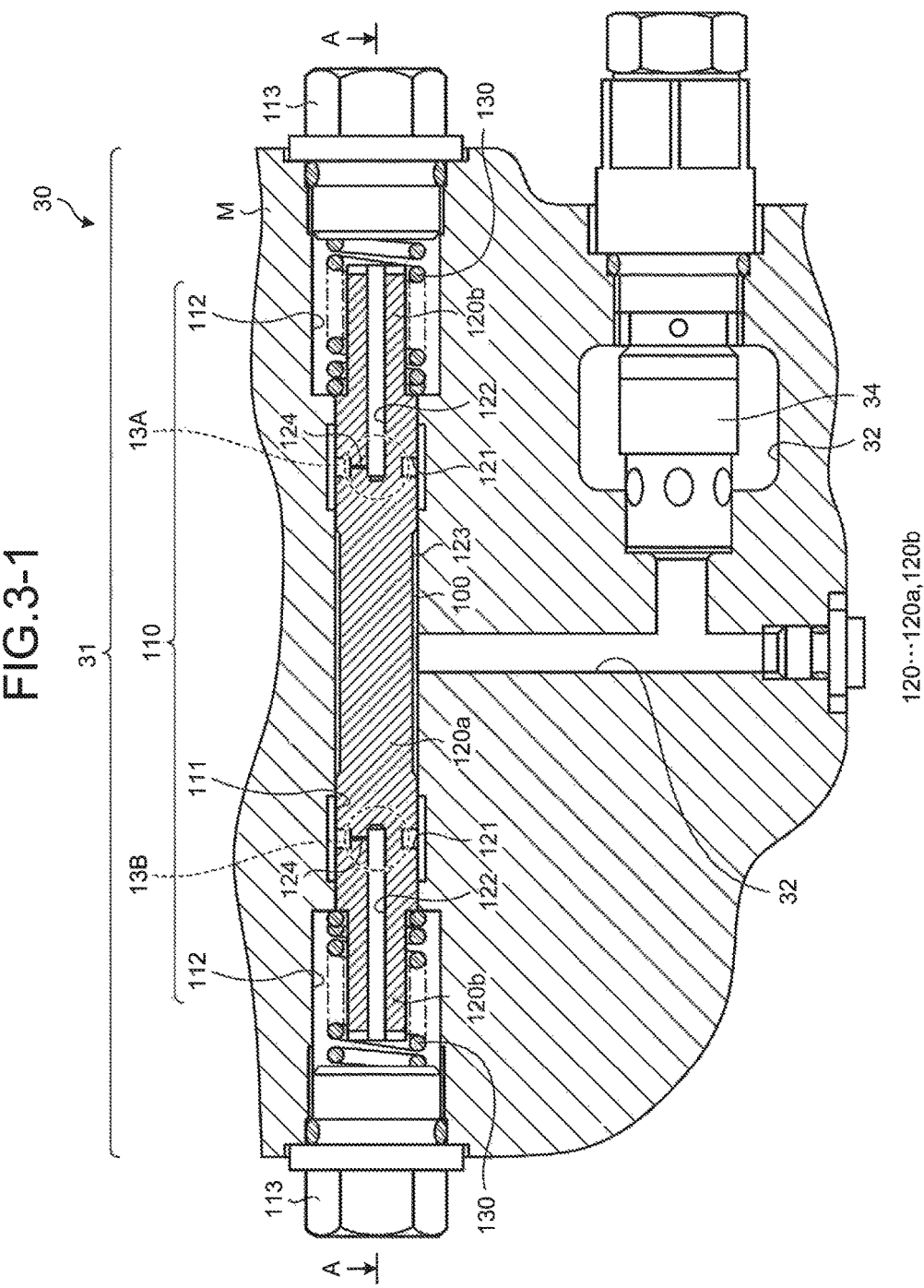
Figures 2, 3:
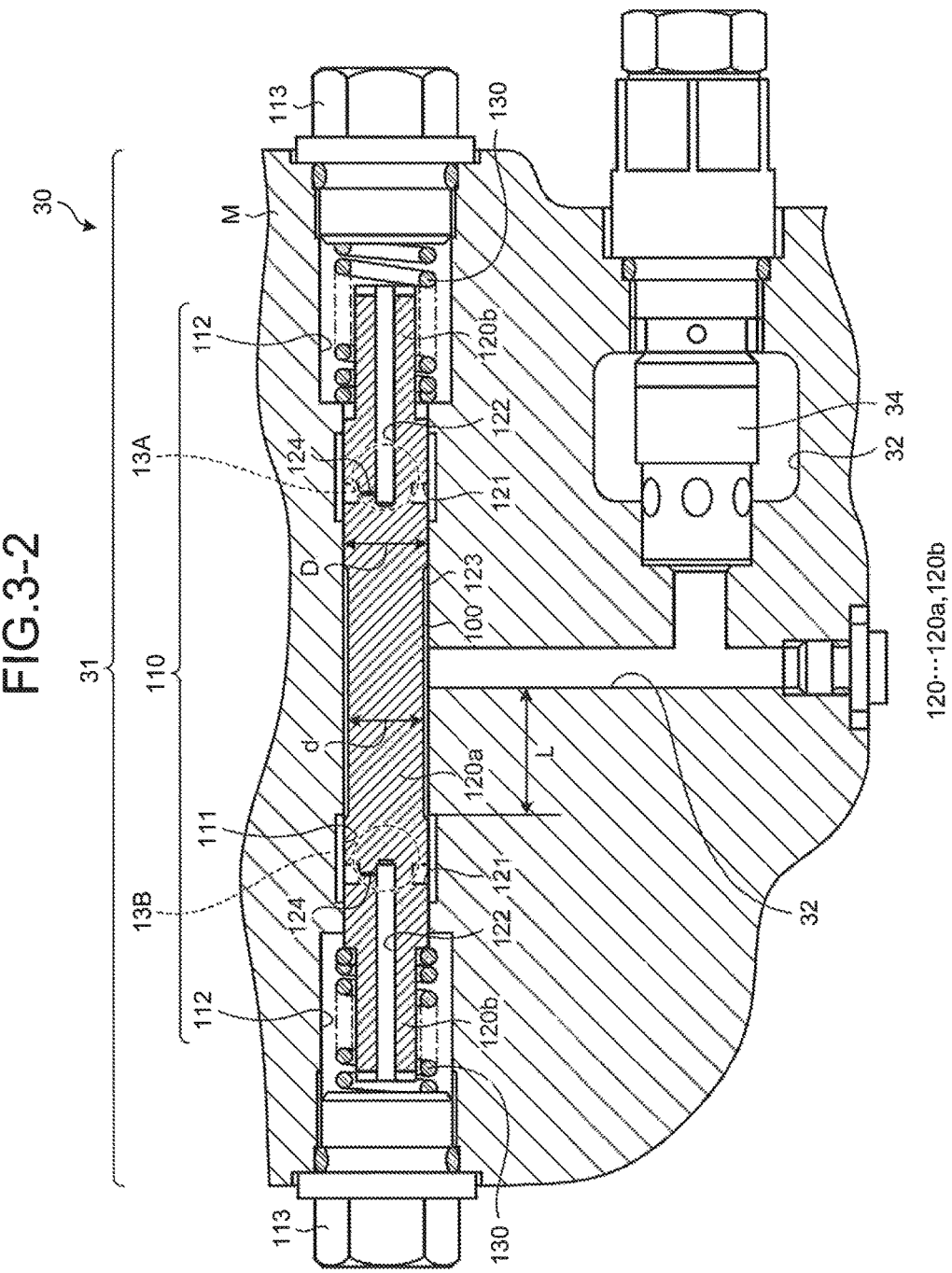
Figure 4:
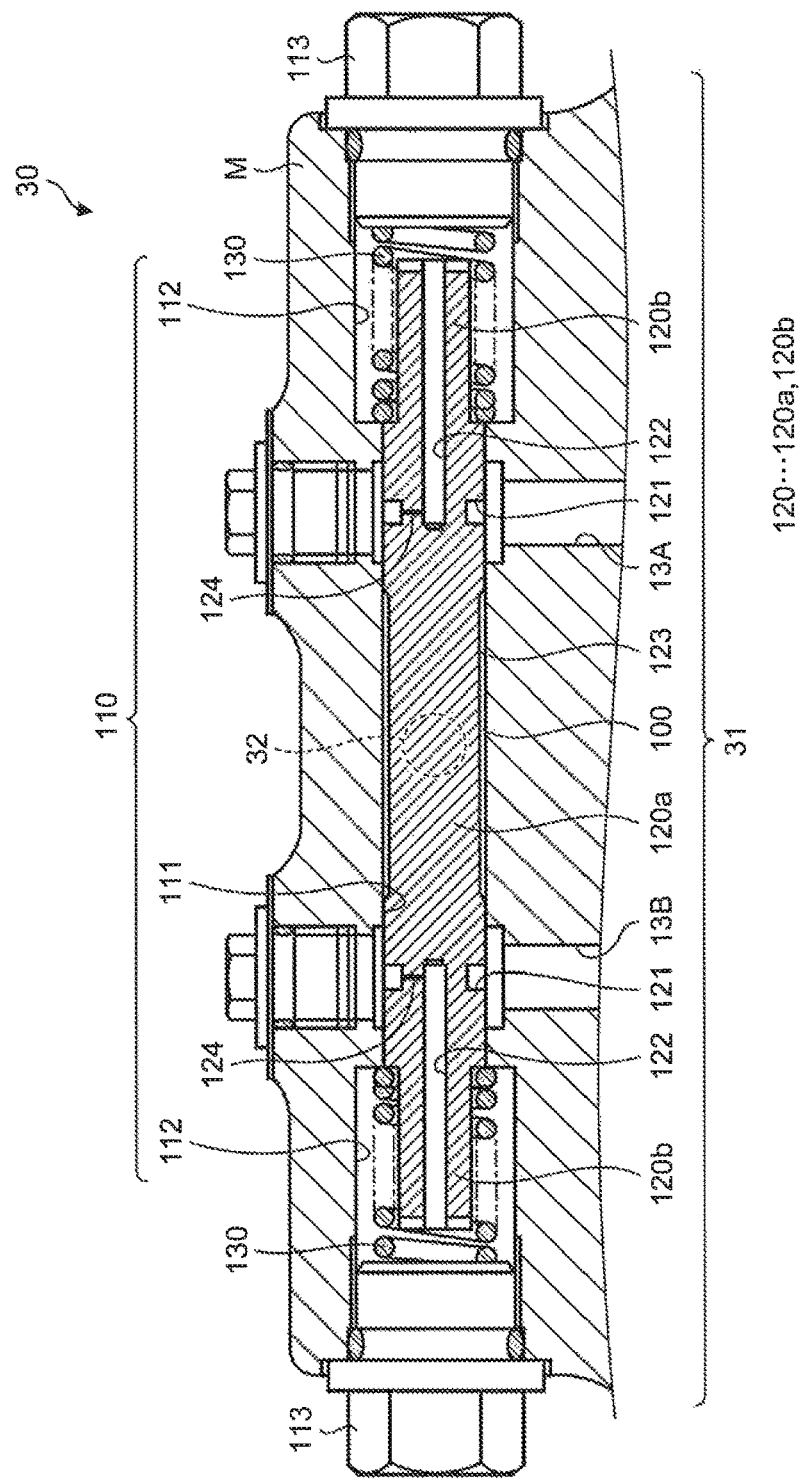
FIG. 4 is a cross-sectional view taken along the line A-A in FIG. 3-1.

FIGS. 3-1 to 4 are views illustrating specific configurations of the flushing unit 30 in which the choke throttle 100 is provided to the low pressure selective valve 31. In the flushing unit 30, the low pressure selective valve 31 is disposed by providing a spool 120 to a spool hole 110 formed in the motor case M.

The spool hole 110 includes a column-shaped sliding hole 111 and pressure chambers 112. The sliding hole 111 has an equable internal diameter. The pressure chambers 112 are provided to both ends of the sliding hole 111. The pressure chambers 112 are column-shaped gaps having an internal diameter larger than the spool hole 110. The pressure chambers 112 are provided so as to have a shaft center same as the sliding hole 111. Each pressure chamber 112 is formed so as to open with respect to an external surface of the motor case M. Further, a plug 113 is screwed into to an opening end of each pressure chamber 112. In the sliding hole 111 of the spool hole 110, not only the pair of main oil passages 13A and 13B, but also a case drain oil passage 32 is communicated at a central position equidistant from the main oil passage 13A and 13B.

The spool 120 is a column-shaped member provided so as to be movable in a longitudinal direction of the spool hole 110, as illustrated in FIGS. 3-1 to 4. The spool 120 herein includes a spool base 120a and a pair of spool small-diameter portions 120b. The spool base 120a is a column-shaped portion having an external diameter capable of being slidably stored in the sliding hole ill of the spool hole 110. A dimension in a longitudinal direction of the spool base 120a is set so as to be similar to a longitudinal direction of the sliding hole 111. The spool small-diameter portions 120b are column-shaped portions provided to both ends of the spool 120, and have an external diameter smaller than an internal diameter of the sliding hole 111. In an outer periphery of each spool small-diameter portion 120b, a coil spring 130 is proved. The coil spring 130 is stored in the pressure chamber 112 with one end thereof being in contact with the plug 113, while the other end being in contact with a step provided between the spool base 120a and the spool small-diameter portion 120b. Due to spring force of the coil spring 130, the spool 120 is maintained at a position where the whole length of the spool base 120a is disposed in the sliding hole 111 (hereinafter referred to as a "neutral position"). The dimension of the spool 120 in the longitudinal direction is set to have a length long enough for locating each end at the pressure chamber 112 of the motor case M, and for providing a gap between each end surface and the plug 113. In the spool 120, a pair of recess portions 121, a pair of center holes 122, and a single gap component 123 are provided.

The recess portions 121 are annular recessed portions provided to an outer periphery of the spool base 120a. When the spool 120 is located at the neutral position, each recess portion 121 is respectively located at a position opened with respect to the main oil passages 13A and 13B. The center holes 122 are holes having a thin diameter formed from the end of the spool 120, and locating at a position which is to be the central axis of the spool 120. Each center hole 122 is formed until a position corresponding to the recess portion 121, and is communicated with the recess portion 121 through a communicating hole 124 formed in a radial direction. The gap component 123 is a column-shaped portion provided, at a position between the pair of main oil passages 13A and 13B, in the outer periphery of the spool base 120a. A diameter of the gap component 123 is shaped slightly narrower than the spool base 120a. The gap component 123 is configured to provide the choke throttle 100 due to an annular gap flow between the same and the sliding hole 111 of the spool hole 110. Each dimension of the gap component 123 is set so as to satisfy the following formula, in a case where "D" represents the external diameter of the spool base 120a, "d" represents an external diameter of the gap component 123, and "L" represents a choke length. Note that the choke length is a distance from opening edges of the main oil passages 13A and 13B to an opening edge of the case drain oil passage 32.

$$0 < (\delta^2) \cdot d/L < 2.5$$

Note that $\delta = (D-d)/2$

In the flushing unit 30 configured in the above-mentioned way, in cases where the oil is circulatively supplied to the hydraulic motor 12 through the pair of main oil passages 13A and 13B by driving the hydraulic pump 11, the oil in each of the main oil passages 13A and 13B is supplied to the pressure chamber 112 through the recess portion 121, the communicating hole 124, and the center hole 122. As a result, the spool 120 moves toward the pressure chamber 112 in the lower pressure side. Further, portions between the main oil passage 13A or 13B in the lower pressure side and the case drain oil passage 32 are communicated through the choke throttle 100. Then, the oil in the main oil passage 13A or 13B in the lower pressure side is discharged inside the motor case M through the case drain oil passage 32 and the charge relief valve 34.

In this period, according to the hydraulic driving device of the first embodiment, the choke throttle 100 which is easily influenced by the oil viscosity is provided to the low pressure selective valve 31. Therefore, under the condition where the oil temperature is low, the amount of the oil discharged from the main oil passage 13A or 13B in the lower pressure side to the motor case M is decreased. Accordingly, even in a case of carrying out shuttle operation, a sudden brake, or stop operation with respect to the working vehicle, it is possible to suppress generation of the peak pressure inside the motor case M. Further, there is no possibility that the oil seal 40 between the motor case M and the output shaft 12a is damaged. Moreover, under the condition where the oil temperature is high, an amount of oil that passes the choke throttle 100 increases. Therefore, the amount of the oil to be flushed can be sufficiently acquired, and there is no possibility that the cooling effect on the hydraulic motor 12 is deteriorated.

Note that in the above-mentioned first embodiment, the choke throttle 100 due to the annular gap flow is provided to the low pressure selective valve 31. However, the present invention is not necessarily restricted thereto. For example, as a second embodiment illustrated in FIGS. 5-1 and 5-2, a choke throttle 200 due to the annular gap flow may be provided to a case drain oil passage 32 which is lower than a low pressure selective valve 31. Alternatively, as a third embodiment illustrated in FIGS. 6-1 and 6-2, a choke throttle 300 due to a cylindrical gap flow may be provided to a case drain oil passage 32 which is lower than a low pressure selective valve 31. Hereinafter, the second embodiment and the third embodiment will be described.

(Second Embodiment)

Figures 1, 5:
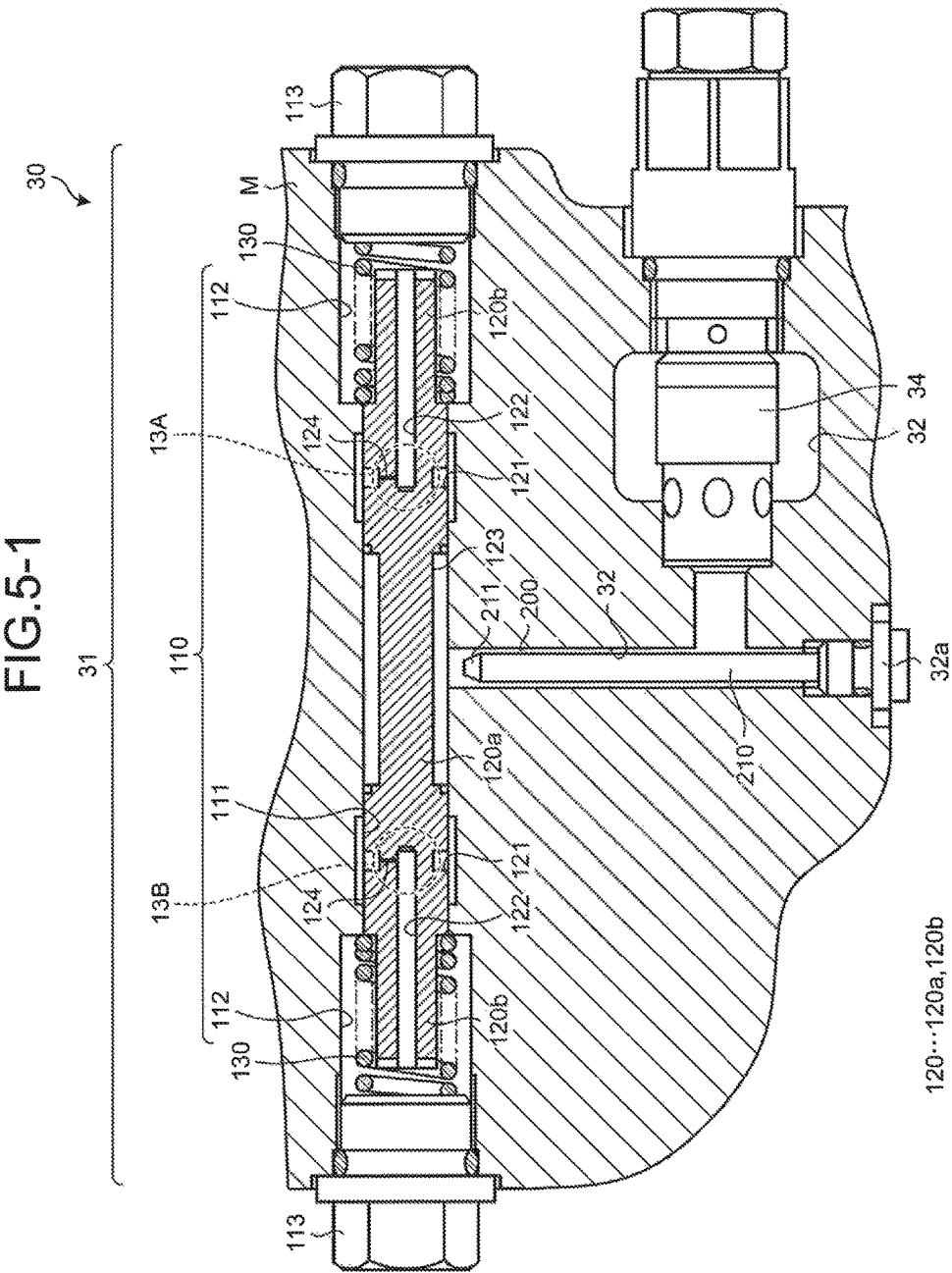
Figures 2, 5:
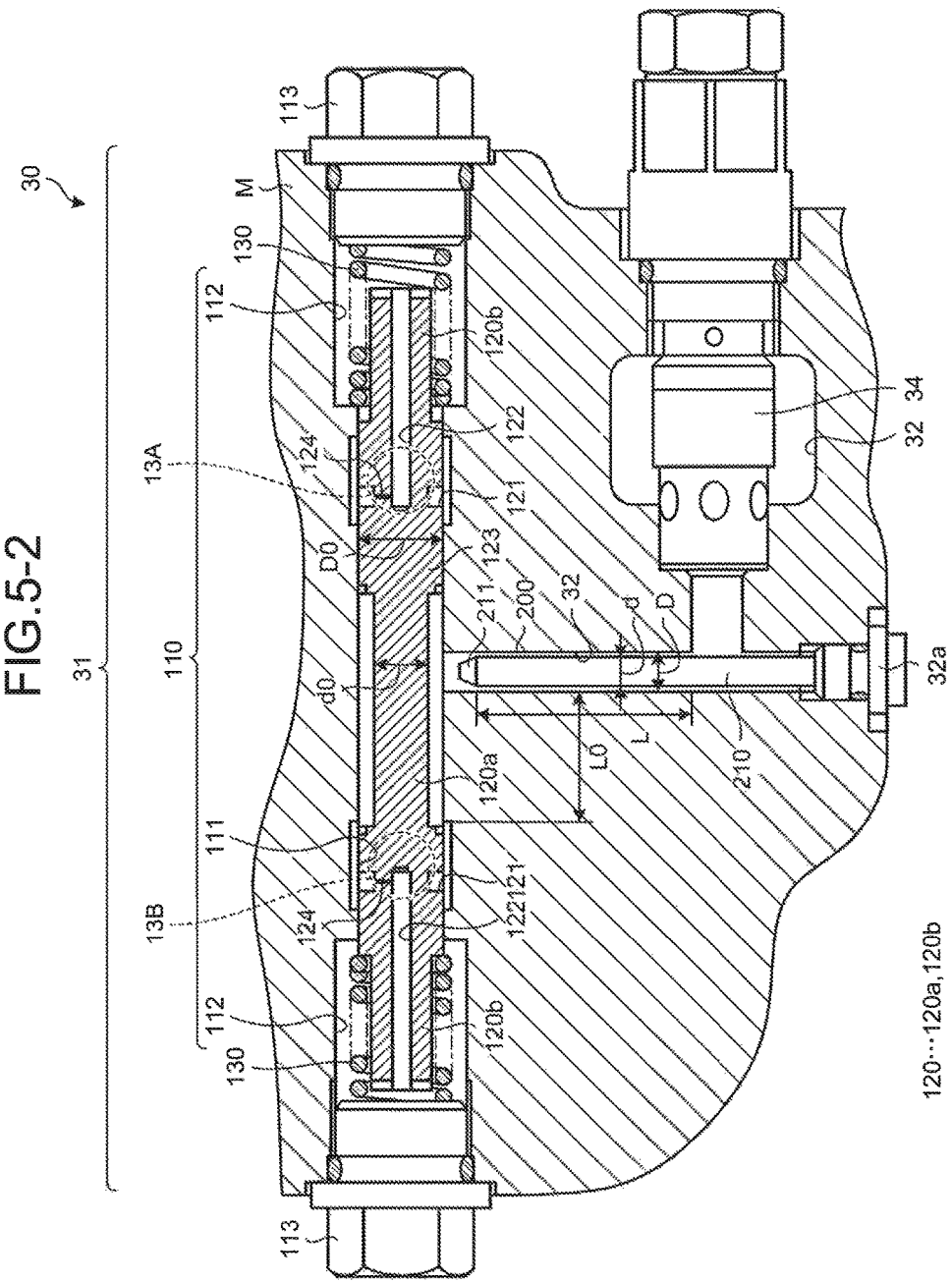

FIGS. 5-1 and 5-2 are views illustrating main parts of a hydraulic driving device according to a second embodiment of the present invention. In the second embodiment, a low pressure selective valve 31 is disposed by providing a spool 120 to a spool hole 110 shaped in a motor case M in a similar way in the first embodiment. However, a configuration of a gap component 123 is different from that in the first embodiment. In other words, in the second embodiment, in order not to provide the choke throttle 100 in the first embodiment between a sliding hole 111 of the spool hole 110 and the gap component 123 of the spool 120, the gap component 123 is provided so that $(\delta^2) \cdot d0/L0$ becomes larger than 10.0 ($10.0 < (\delta^2) \cdot d0/L0$ (note that $\delta = (D0-d0)/2$)). Herein, "D0" represents an external diameter of the spool base 120a, "d0" represents an external diameter of the gap component 123, and "L0" represents a throttle length.

On the other hand, in a case drain oil passage a choke rod 210 is provided to a straight-line portion between the same and a charge relief valve 34. The choke rod 210 is a column-shaped member integrally provided with a plug 32a which closes an opening end of the case drain oil passage 32. A diameter of the choke rod 210 is shaped narrower than an internal diameter of the case drain oil passage 32. In the choke rod 210, a taper 211 is provided to a leading end opposed to the spool 120. An external diameter of the taper 211 gradually decreases while approaching the spool 120. Regarding a choke throttle 200 due to the annular gap flow, configured in the second embodiment, each dimension is set so as to satisfy the following formula, in a case where "D" represents the internal diameter of the case drain oil passage 32, "d" represents an external diameter of the choke rod 210, and "L" represents a choke length. The choke length in the second embodiment is a part denoted by "L" in FIG. 5-2.

$$0 < (\delta^2) \cdot d/L < 2.5$$

Note that $\delta = (D-d)/2$

Note that the same configurations in the second embodiment as those in the first embodiment are denoted by the same reference numerals and explanations thereof will not be described herein.

Even in the hydraulic driving device according to the second embodiment, the choke throttle 200 which is easily influenced by oil viscosity is provided to the low pressure selective valve 31. Therefore, under a condition where oil temperature is low, an amount of oil discharged from a main oil passage 13A or 13B in the lower pressure side to the motor case M is decreased. Accordingly, even in a case of carrying out shuttle operation, a sudden brake, or stop operation with respect to a working vehicle, it is possible to suppress generation of peak pressure inside the motor case M. Further, there is no possibility that an oil seal 40 between the motor case M and an output shaft 12a is damaged. Moreover, under a condition where the oil temperature is high, an amount of oil that passes the choke throttle 200 increases. Therefore, an amount of oil to be flushed can be sufficiently acquired, and there is no possibility that cooling effect on a hydraulic motor 12 is deteriorated.

(Third Embodiment)

Figures 1, 6:
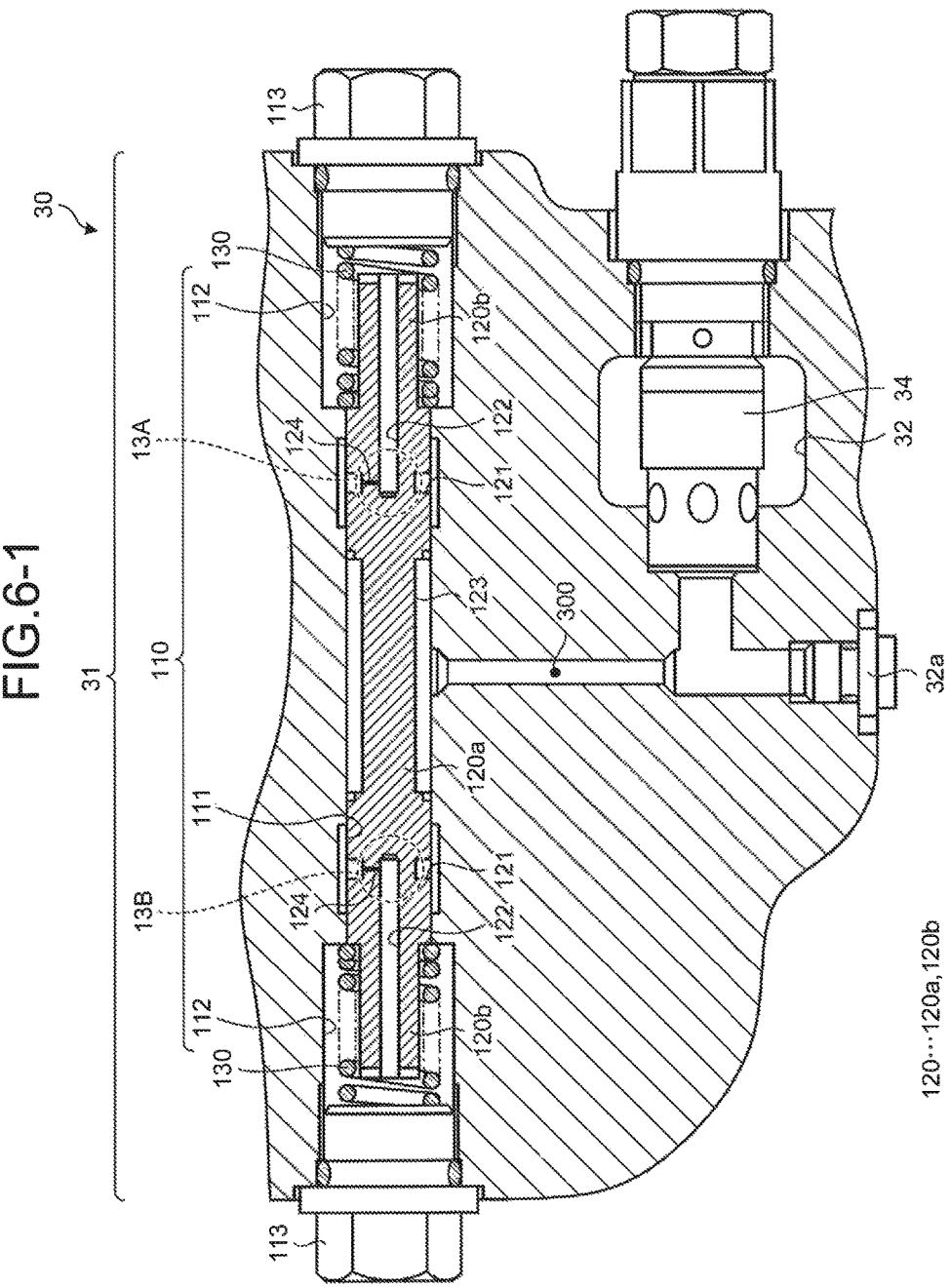
Figures 2, 6:
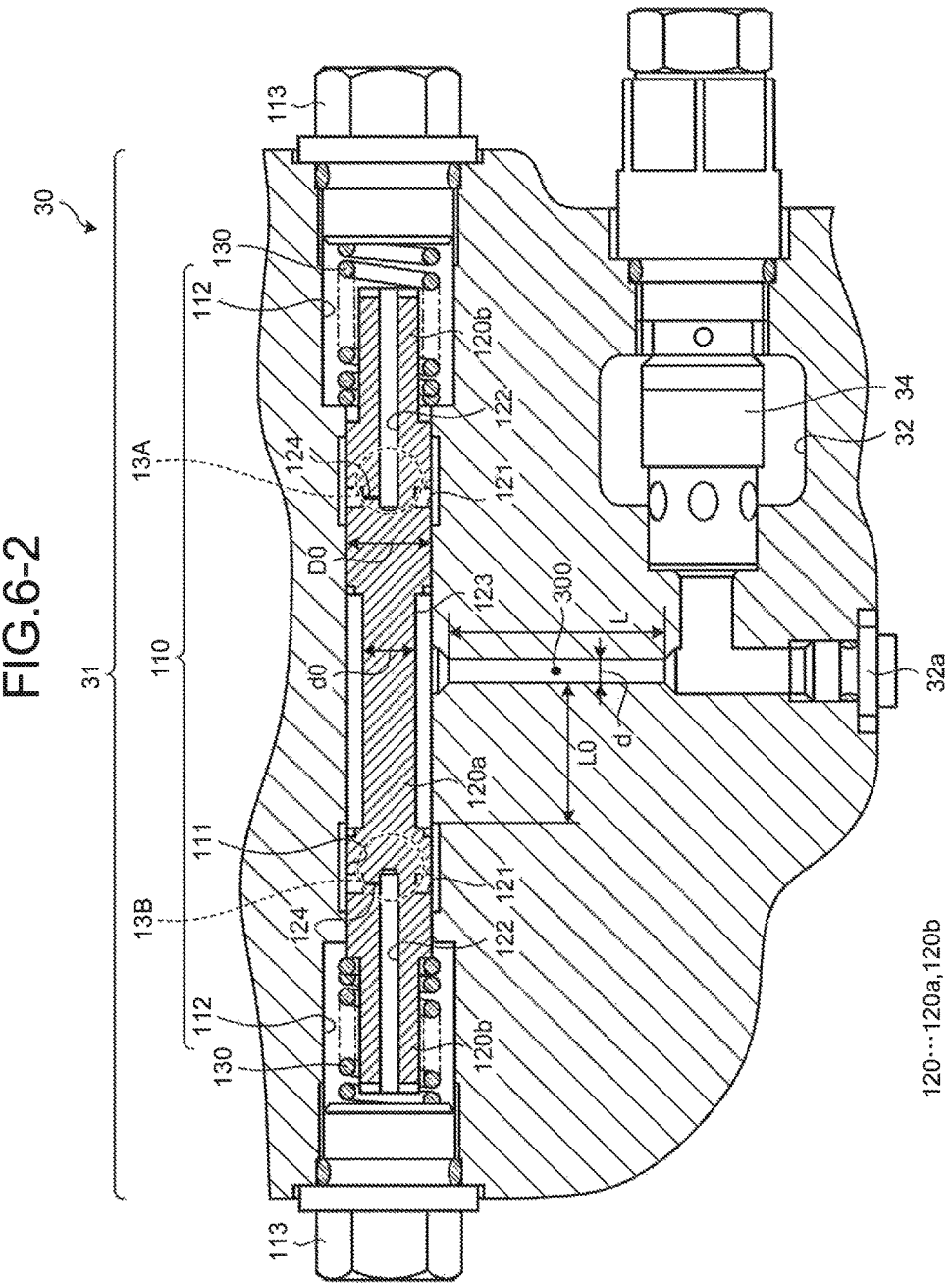

FIGS. 6-1 and 6-2 are views illustrating main parts of a hydraulic driving device according to a third embodiment of the present invention. In the third embodiment, a low pressure selective valve 31 is disposed by providing a spool 120 to a spool hole 110 shaped in a motor case M in a similar way in the first embodiment. However, a configuration of a choke throttle 300 is different from that in the first embodiment. In other words, in the third embodiment, in order not to provide the choke throttle 100 in the first embodiment between a sliding hole 111 of the spool hole 110 and a gap component 123 of the spool 120, the gap component 123 is provided so that $(\delta^2) \cdot d0/L0$ becomes larger than 10.0 ($10.0 < (\delta^2) \cdot d0/L0$ (note that $\delta = (D0-d0)/2$)). Herein, "D0" represents an external diameter of a spool base 120a, "d0" represents an external diameter of the gap component 123, and "L0" represents a throttle length.

On the other hand, in a case drain oil passage 32, the choke throttle 300 due to a cylindrical gap flow is provided by thinning down a diameter of a straight-line portion between the same and a charge relief valve 34. Regarding the choke throttle 300, each dimension is set so as to satisfy the following formula, in a case where "d" represents an internal diameter of an oil passage portion provided linearly, and "L" represents a choke length.

$$0 < (d^4)/L < 1.6$$

Note that the same configurations in the third embodiment as those in the first embodiment are denoted by the same reference numerals and explanations thereof will not be described herein.

Even in the hydraulic driving device according to the third embodiment, the choke throttle 300 which is easily influenced by oil viscosity is provided to the low pressure selective valve 31. Therefore, under a condition where the oil temperature is low, an amount of oil discharged from a main oil passage 13A or 13B in the lower pressure side to the motor case M is decreased. Accordingly, even in a case of carrying out shuttle operation, a sudden brake, or stop operation with respect to a working vehicle, it is possible to suppress generation of peak pressure inside the motor case M. Further, there is no possibility that an oil seal 40 between the motor case M and an output shaft 12a is damaged. Moreover, under a condition where the oil temperature is high, an amount of oil that passes the choke throttle 300 increases. Therefore, an amount of oil to be flushed can be sufficiently acquired, and there is no possibility that cooling effect on a hydraulic motor 12 is deteriorated.

In each of the above-mentioned first embodiment to third embodiment, the closed circuit is configured to be provided between the hydraulic pump 11 and the hydraulic motor 12 by the pair of main oil passages 13A and 13B. However, the present invention is not restricted thereto.

REFERENCE SIGNS LIST 11 hydraulic pump
12 hydraulic motor
13A,13B main oil passage
31 low pressure selective valve
32 case drain oil passage
33 tank oil passage
34 charge relief valve
40 oil seal
100 choke throttle
110 spool hole
111 sliding hole
120 spool
123 gap component
200 choke throttle
210 choke rod
300 choke throttle
M motor case
T oil tank

The invention claimed is:

1. A hydraulic driving device comprising:
a hydraulic motor configured to operate by flushing oil from a hydraulic pump through a high pressure oil passage and a low pressure oil passage;
a low pressure selective valve configured to operate in accordance with differential pressure between the high pressure oil passage and the low pressure oil passage, and to discharge the oil in the low pressure oil passage inside a motor case; wherein the low pressure selective tank includes a spool,
a tank oil passage configured to connect the inside of the motor case with an oil tank; and
a choke throttle being provided within the low pressure selective valve and disposed substantially coaxially and symmetrically to a central horizontal axis of the spool, wherein the spool includes a first annular recess portion, a second annular recess portion, a first center hole, and a second center hole, the first center hole and the second center hole being extended along a central axis of the spool to respective positions of the first annular recess portion and the second annular recess portion and with a uniform diameter, the first center hole and the second center hole being in fluid communication with the first annular recess portion and the second annular recess portion, respectively, the first annular recess portion and the second annular recess portion being in fluid communication with the high pressure oil passage and the low pressure oil passage, respectively.

2. The hydraulic driving device according to claim 1, wherein
the high pressure oil passage supplies oil discharged from the hydraulic pump to the hydraulic motor, and the low pressure oil passage is connected so as to flow back the oil discharged from the hydraulic motor to the hydraulic pump, and is included in a closed circuit which circulatively supplies the oil between the hydraulic motor and the hydraulic pump together with the high pressure oil passage.

3. A hydraulic driving device for a wheel loader, the hydraulic driving device comprising:
a hydraulic motor configured to operate by flushing oil from a hydraulic pump through a high pressure oil passage and a low pressure oil passage;
a low pressure selective valve configured to operate in accordance with differential pressure between the high pressure oil passage and the low pressure oil passage, and to discharge the oil in the low pressure oil passage inside a motor case; wherein the low pressure selective valve includes a spool,
a tank oil passage configured to connect the inside of the motor case with an oil tank; and
a choke throttle being provided within the low pressure selective valve and disposed substantially symmetrically to a central axis of the spool, 1, wherein the spool includes a first annular recess portion, a second annular recess portion, a first center hole, and a second center hole, the first center hole and the second center hole being extended along a central axis of the spool to respective positions of the first annular recess portion and the second annular recess portion and with a uniform diameter, the first center hole and the second center hole being in fluid communication with the first annular recess portion and the second annular recess portion, respectively, the first annular recess portion and the second annular recess portion being in fluid communication with the high pressure oil passage and the low pressure oil passage, respectively;
wherein the choke throttle is an annular gap flow that satisfies the following formula.

$$0 < (\delta^2) \cdot d/L < 2.5$$

where $\delta=(D-d)/2$, "D" represents a choke external diameter, "d" represents a choke internal diameter, and "L" represents a choke length.

4. The hydraulic driving device according to claim 1, wherein the choke throttle is a cylindrical gap flow that satisfies the following formula.

$$0 < (d^4)/L < 1.6$$

where "d" represents a choke internal diameter, while "L" represents a choke length.

* * * * *